Figure 1:
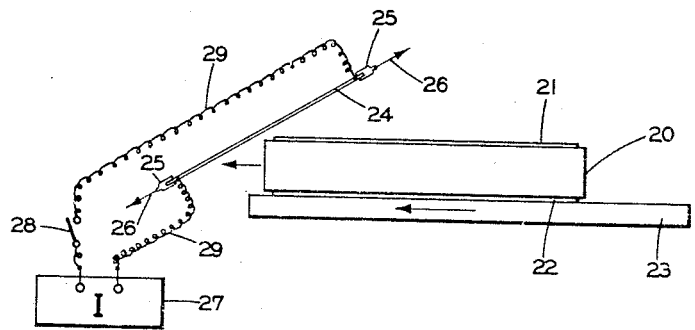

Aug. 23, 1949.　　　　　C. K. GRAVLEY　　　　　2,479,926
ELECTROTRANSDUCER AND METHOD OF MAKING SAME
Filed Oct. 11, 1947　　　　　　　　　　　　　　3 Sheets-Sheet 1

INVENTOR.
CHARLES K. GRAVLEY
BY
*Eley J. Hyde*
ATTORNEY

Aug. 23, 1949.　　　　　　C. K. GRAVLEY　　　　　　2,479,926
ELECTROTRANSDUCER AND METHOD OF MAKING SAME
Filed Oct. 11, 1947　　　　　　　　　　　　　　3 Sheets-Sheet 2

INVENTOR.
CHARLES K. GRAVLEY
BY
ATTORNEY

Aug. 23, 1949.   C. K. GRAVLEY   2,479,926
ELECTROTRANSDUCER AND METHOD OF MAKING SAME
Filed Oct. 11, 1947   3 Sheets-Sheet 3

*INVENTOR.*
CHARLES K. GRAVLEY
BY
ATTORNEY

Patented Aug. 23, 1949

2,479,926

UNITED STATES PATENT OFFICE 2,479,926

ELECTROTRANSDUCER AND METHOD OF MAKING SAME

Charles K. Gravley, Cleveland Heights, Ohio, assignor to The Brush Development Company, Cleveland, Ohio, a corporation of Ohio Application October 11, 1947, Serial No. 779,327

6 Claims. (Cl. 171—327)

This invention pertains broadly to a new and novel electro-transducer element, and to the method of fabricating the same, and more particularly to a piezo-electric crystal element and the method of making same.

Prior art piezoelectric crystal elements comprising one or more plates of crystalline material with electrodes such as foil, graphite or evaporated metal on major faces have utilized leads formed of thin ribbon-like electrically conductive material. When piezoelectric elements utilizing such ribbon-like leads were moistureproofed by dipping them in moistureproofing material, it was found difficult to assure a good, uniform, moisture-tight seal between the moistureproofing material and the lead. This was due probably to the extreme thinness of the lead and the tendency of the moistureproofing material when liquid to pull away from sharp edges and corners.

Another disadvantage of a foil-like lead was encountered when a number of plates of crystalline material were connected together in a stack with leads extending out from between the plates at one end of the composite element. The foil-like lead caused the composite element to be appreciably thicker at the lead end than at the other end, with consequent non-parallelism of the several crystal plates.

Other serious disadvantages are encountered in the use of foil-like leads in multi-plate assemblies, and are particularly serious in the fabrication of thin multi-plate flexing elements such as "twisters" and "benders." "Twister" and "bender" crystal elements are almost always thin compared to expander plates and they are usually dipped in a hardenable liquid moistureproofing compound. The thickness dimension of each plate, in a finished multi-plate element, may be of the order of a few thousandths of an inch, but in the mass production of such elements it is usual to cut the plates considerably thicker in order to reduce breakage loss. One face of each of two properly oriented plates is milled smooth and an electrode such as graphite, metallic foil or evaporated metal is applied to each of them. A foil-like lead is then connected to one of the faces in contact with the electrode and the two plates are cemented together with the two electroded faces in engagement with each other. Each of the two plates is then milled down to its proper thickness, the outside faces are then electroded, and a lead is connected to the two outside electrodes. Thus the two plates support and strengthen each other during the final two milling operations. Were it not for this mutual support the scrap produced in milling the individual unsupported plates would be very high, probably leading to a cost of the finished product which would be too high for commercial sale.

The aforedescribed production technique requires the placing of the center lead prior to the final milling operations. This is a disadvantage which, through necessity, has been tolerated for years, but it led to some scrapping of material due to leads being cut off in the final milling operations. Operator care will of course reduce the number of severed leads, but experience has shown that it cannot be eliminated.

A process has been developed whereby the edges of crystal plates, particularly of multi-plate "twisters" and "benders," can be rounded by brushing in order greatly to increase the effectiveness of moistureproofing material. For a detailed description of the process and the reasons therefor reference may be had to United States Patent application Serial No. 559,524 (now Patent No. 2,439,466, issued April 13, 1948), filed in the name of Charles K. Gravley, for Method of fabricating piezoelectric crystals, and assigned to the same assignee as the present invention. In the performance of this process, and other process for rounding crystal edges such as tumbling, it is highly desirable that the several plates forming a multi-plate element be cemented together prior to the center lead being positioned between them.

Applications Serial No. 779,268 and Serial No. 779,269, filed concurrently herewith in the name of Alfred L. W. Williams, and assigned to the same assignee as the present invention, disclose transducer elements whose leads are fused into the transducer material, and disclose the method of using the leads into the material.

It is an object of the invention to provide a process for manufacturing a multi-plate piezoelectric crystal element wherein the plates are connected together prior to the application of the electrical leads.

A further object of the invention is to provide a method for manufacturing a piezoelectric crystal element which does not entail disadvantages of the prior art methods.

Another object of the invention is to provide a method for manufacturing an improved piezoelectric crystal element of the multi-plate flexing type.

Still another object of the invention is to provision of a new and improved multi-plate flexing type piezoelectric crystal element, It is also an object of the invention to provide a method of fabricating multi-plate flexing type piezoelectric crystal elements which reduces scrap to a minimum.

A further object of the invention is to provide a new and novel piezoelectric crystal element.

In accordance with a feature of the invention, an electro-transducer element comprises a body of electro-transducing material with electrode means on at least one planar surface portion of the body. A lead comprising a conductor is fused into the body at an angle to the plane of the electrode means and it is in electrical contact with the electrode means.

In accordance with another feature of the invention, the method of fabricating a piezoelectric crystal element comprises electroding a face of a plate of piezoelectric crystalline material, heating a lead to a temperature above the melting temperature of the crystalline material, and pressing said heated lead against the plate. The direction of extension of the lead is at an angle to the plane of the electrode and causes the crystalline material in the immediate vicinity of the heated lead to melt and the lead to cut into the crystalline material sufficiently far that it is in electrical contact with the electrode. Thereafter the lead and the melted crystalline material are cooled.

For a better understanding of the present invention, together with other and further objects thereof, reference is had to the following description taken in connection with the accompanying drawings, and its scope will be pointed out in the appended claims.

Figures 2, 3:
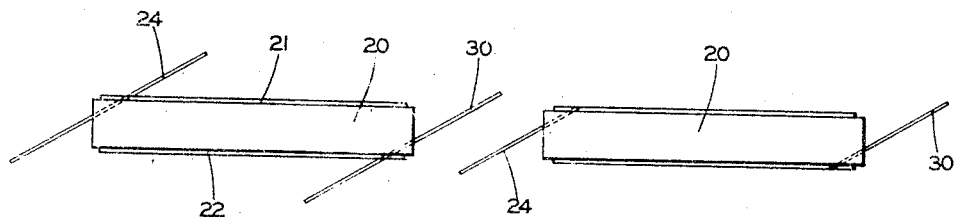
Figure 4:
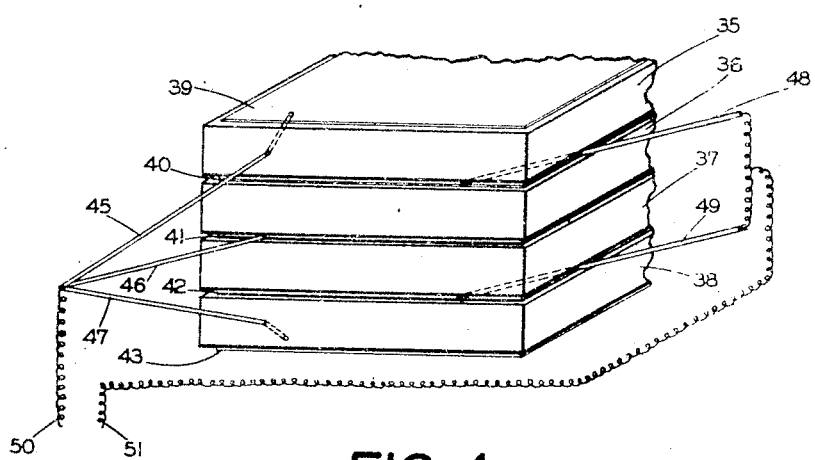
Figure 5:
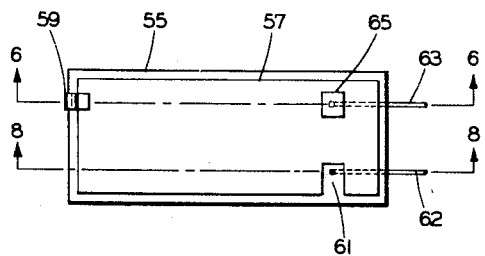
Figure 7:
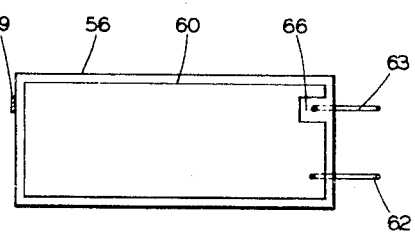
Figure 6:
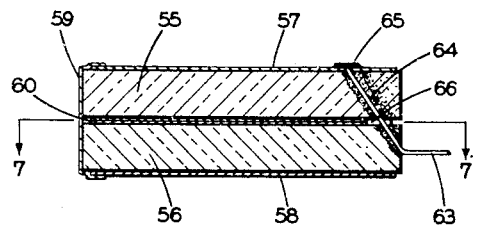
Figure 8:
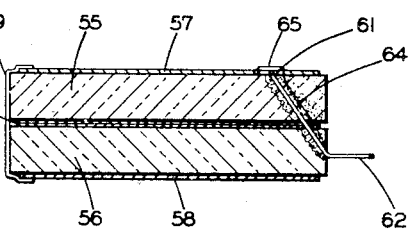
Figure 9:
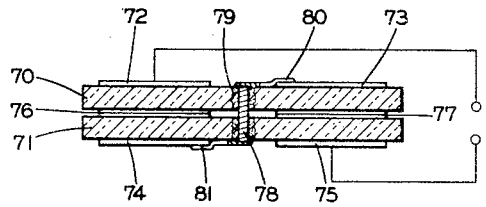

In the drawings, Fig. 1 is a schematic side view showing a step in the process of the invention; Figs. 2 and 3 show subsequent steps in the process; Fig. 4 is an isometric view showing the invention applied to a multi-plate element; Fig. 5 is a face view of a multi-plate flexing type of piezoelectric element embodying the invention; Fig. 6 is a sectional view taken along line 6—6 of Fig. 5; Fig. 7 is a sectional view taken along line 7—7 of Fig. 6; Fig. 8 is a sectional view taken along line 8—8 of Fig. 5; Fig. 9 is a sectional view taken along line 9—9 of Fig. 10 and showing the invention applied to a slightly different multi-plate flexing element; and Figs. 11 to 17 show the steps in the method of manufacturing an improved multi-plate flexing type piezoelectric crystal element embodying the invention.

Referring now to Fig. 1, there is shown a body of electro-transducing material 20 such as a piezoelectric crystal with electrode means 21, 22 on two of its opposite faces. The body of transducing material should fuse at elevated temperatures. For example, it could be Rochelle salt which fuses at about 75 degrees centigrade, or it could be primary ammonium phosphate which fuses at about 190 degrees centigrade. The invention, however, is not limited to these two materials as it is applicable to any transducer material which will fuse or melt.

The lead 24 which is to be connected to the transducer body 20 preferably is a solid wire about 3 mils in diameter. Three strands of 1 mil diameter wire braided or twisted together is also satisfactory. The ends of the length of wire 24 are connected to a suitable mechanism which holds the wire taut and extending in a direction at an angle to the plane of the electrodes 21, 22. Two clips 25, 25 are illustrated which are pulled in the direction of the arrows 26, 26 by any suitable mechanism (not shown). The wire 24 is connected in an electric circuit comprising the wires 29, 29, the switch 28, and a source of electric current 27. The switch 28 is closed, and the wire 24 heats up to a temperature above the temperature at which the transducer material fuses. After the wire 24 heats to a suitable temperature, the transducer 20, which is mounted on a slidable base 23, is pushed into contact with it. The wire 24 is held taut by the pull on clamps 26, 26 and, as the transducer 20 is pushed into it, the hot wire melts a small localized area of the transducer and cuts its way into the body 20 until the pushing force on the transducer is relieved. The flow of electric current is terminated by opening switch 28 and the wire 24 is allowed to cool. As the wire cools, the melted transducer material fuses around it and holds it tight. Two such leads 24, 30 are usually connected to a simple transducer body such as that shown in Fig. 2, and each lead extends through and is in contact with only one of the two transducer electrodes.

Each of the leads 24 and 30 subsequently is clipped off at the surface of its electrode 21 or 22, as is shown in Fig. 3.

The invention is applicable to the fabrication of stacks of expander plates. Often 10, 12, 14 or more expander plates are connected together with their major faces in registration and with electrodes between the several plates. Fig. 4 shows a multi-plate expander comprised of four plates of crystalline material 35, 36, 37 and 38, with eelctrodes 39 and 43 on the outer faces of plates 35, 38, and with inner electrodes 40, 41 and 42 between the plate. Leads 45, 46 and 47 are connected, respectively, to electrodes 39, 41 and 43, and each is connected to the terminal 50. Leads 48 and 49 are connected, respectively, to electrodes 40, 42 and each is connected to the terminal 51. The several crystal plates are connected electrically in parallel. The crystal plate 35 is so oriented with respect to the mother crystal that, when it is subjected to a given electric field, it will expand in the direction of its first major dimension and will contract in the direction of its second major dimension. The crystal plate 36 is so oriented that, upon being subjected to the same given electric field, it will contract in the direction of its first major dimension and will expand in the direction of its second major dimension. In the assembly shown in Fig. 4, the lead connections are such that an electric signal applied across the terminals 50, 51 subjects the crystal plate 36 to an electric field whose direction through the crystal plate 36 is the reverse of the direction through the plate 35. Accordingly, both plates simultaneously expand and contract in the same directions. The crystal plates 37 and 38 are similarly connected so that all of the plates in the assembly simultaneously expand in one direction and contract in another in accordance with a signal applied at the terminals 50, 51.

The leads 45 and 47 are connected, respectively, to plates 35 and 38 in accordance with the process illustrated in Figs. 1, 2 and 3, preferably after the several crystal plates have been connected together. Leads 41, 48 and 49 are each connected to the assembly of crystal plates by a process similar to the previously described process, the only difference being that the lead wire extends in a direction parallel to the plane of the electrode with which it is in contact. One outstanding advantage of this method of applying leads is that the assembly of crystal plates is made without leads, whereby parallelism of the plates is assured. Subsequent application of the leads does not disturb this parallelism. The above process which applies the leads as the last step in the assembly process is advantageous in that the crystal assembly may be handled more easily when the leads are not connected to it, and operations such as tumbling and brushing to round the edges and corners slightly may be performed without the danger of breaking off the leads. This advantage is most outstanding in the fabrication of multi-plate flexing units because such units are almost always covered with a thin layer of moistureproofing material, and this material is usually applied to the crystal unit by dipping the unit in a bath of the material. It is known that the material, while still liquid, tends to pull away from the sharp edges and corners resulting in a thinner coating at those locations. Moisture penetrates the coating at the thin spots and soon damages the crystal unit. To improve the protection that the coating affords the crystal, it is important to round all of the sharp edges and corners of the plates prior to the step of dipping the crystal in liquid moistureproofing material. However, in mass production before the present invention, this has been difficult to do and expensive. The leads, which were of necessity connected to the plates when the plates were cemented together, would interfere with the process of rounding the edges and corners of the plate. Often the leads were inadvertently removed during the rounding process, resulting in high scrap loss at an advanced point in the production of the crystal elements where each scrapped element represented a substantial investment in material and labor.

Figs. 5 to 8 illustrate the application of the invention to a multi-plate flexing type piezoelectric crystal element.

In order that the drawings clearly show the invention, the thickness dimension of the element has been greatly exaggerated with respect to its other dimensions.

The multi-plate element shown is of the "bender" type and comprises two piezoelectric expander plates 55, 56 with outer electrodes 57 and 58, respectively, and with an inner electrode 60. An electrical conductor or jumper 59 is connected between the outer electrode 57 and the outer electrode 58 so that an external lead in contact with either one of the outer electrodes is electrically connected to the other outer electrode. The inner electrode 60 does not extend to the outside edge of the crystal plates 55, 56 so that it is not in contact with the jumper 59.

The edges of the outer electrode 57 are spaced inwardly from the edges of the crystal plate 55 to provide an unelectroded margin, and in addition thereto a small area 61 spaced inwardly from the margin is also free from the electrode 57. After the two plates 55, 56 have been cemented together a lead 62 is fused into the crystal plates in accordance with the procedure described in connection with Figs. 1 to 3. The lead 62 extends from the unelectroded area 61 diagonally down through the crystal plate 55, through the inner electrode 60 and out of one of the edge faces of the plate 56, as is shown in Fig. 8. The lead 62, accordingly, is free from electrical contact with the outer electrodes 57, 58 and is in good electrical contact with the inner electrode 60. A lead 63 is fused into the crystalline material at a location where it is in good electrical contact with the outer electrode 57 but it is free from electrical contact with the inner electrode 60.

Fig. 7 is a plan view showing the inner electrode 60. Its edges are spaced inwardly from the edges of the crystal plate 56 and in addition thereto there is a small area 66 preferably located at one edge which is unelectroded. Care should be exercised when fusing the lead 63 into the multi-plate element that it extends down through this unelectroded area 66 of the inner electrode 60. This assures that it will not be in electrical contact with the inner electrode 60. After the lead 63 has been fused into the crystal element, a small patch 65 of tin-foil or conducting paint may be applied over the end of the lead 63 in order to assure a good electrical contact between the lead and the electrode 57. As has been explained previously, the crystalline material 64 which is fused by the hot wire cutting into the crystalline material, upon hardening, holds the wires tightly in place.

Figure 10:
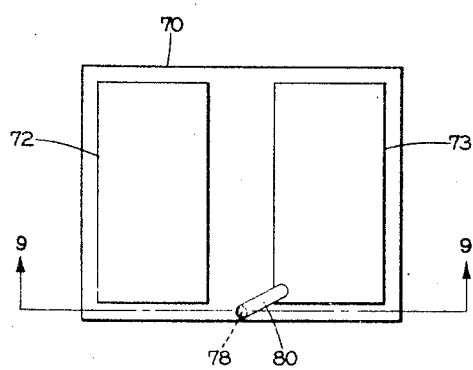
Figure 11:
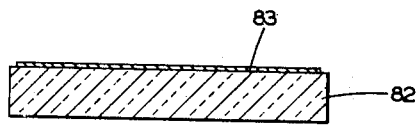
Figure 12:
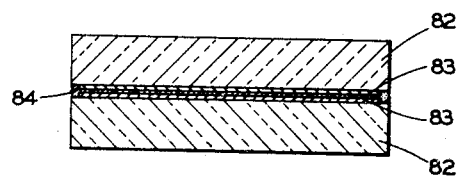
Figure 13:
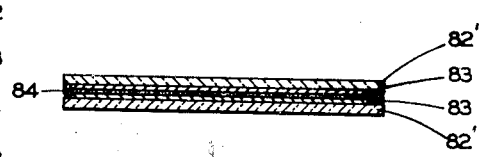
Figure 14:
Figure 15:
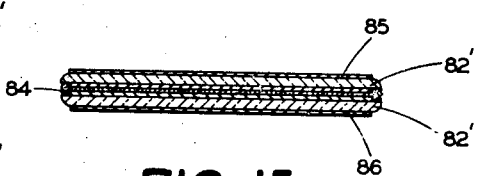
Figure 16:
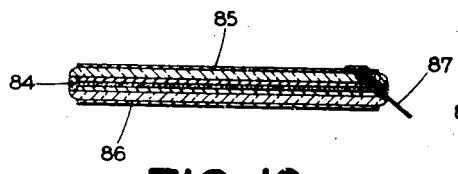
Figure 17:
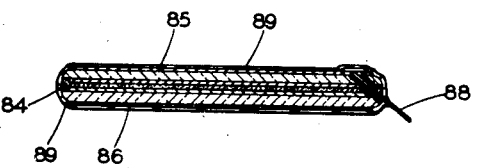

Figs. 9 and 10 illustrate the application of the invention to a modified flexing type piezoelectric crystal element. Crystal plates 70 and 71 carry separate electrodes on the individual halves of their major faces. Thus one of the major faces of the crystal plate 70 carries two electrodes 72, 73, each of which covers a little less than half the area of the face. Crystal plate 71 on its outer major faces carries two electrodes 74, 75, each covering a little less than half of the area of the face. The inner electrodes of the two plates, when the plates are cemented together, form the two inner electrodes 76, 77, and each covers a little less than half of the area of the inner major faces of the plates 70, 71. It is necessary in the operation of this crystal element that the outer electrode 73 of plate 70 be electrically connected to the outer electrode 74 of the plate 71. In accordance with this invention, a wire 78 extending in a direction perpendicular to the major faces of the plates is fused into an edge of the plates at a location substantially midway between the electrodes 72, 73. Fused crystalline material 79, when solidified, firmly holds the wire 78 in place. A jumper 80 is provided on the top major face interconnecting the lead 73 with the wire 78 and a similar jumper 81 is provided between the electrode 74 and the other end of the wire 78. The jumper may be a small foil patch which overlaps the electrode and an end of the wire 78, or it may be conducting paint applied to the surface of the crystal element in overlapping engagement with the electrode and the end of the wire 78. In operation, the multi-plate element shown in Fig. 9 is connected into an electric circuit by means of its electrodes 72, 75.

Figs. 11 to 17 illustrate steps in the method of producing a multi-plate flexing element in accordance with the invention. A relatively thick plate 82 of piezoelectric material, properly oriented with respect to its mother crystal, is provided, and an electrode 83 is applied to one of its smooth major faces. Two such sub-assemblies are made, and are connected together with the electrodes facing each other by an adhesive 84. Silver dust may be mixed with the adhesive in order to make good electrical contact between the two electrodes 83. The thick plates 82 are then milled down to the required thin dimension. The thin plates are identified by reference character 82' in Fig. 13. The sharp corners and edges of the multi-plate unit are then removed to form the unit shown in Fig. 14. One very good process for rounding the corners and edges of a crystal is described and claimed in my copending application for United States Letters Patent Serial No. 559,524 (now Patent No. 2,439,466), for Method of fabricating piezoelectric crystals, which is assigned to the same assignee as the present invention. Suitable outer electrodes 85, 86 are then applied and outer and inner leads 87, 88, respectively, are connected to the unit using the process described in detail in connection with Figs. 5 to 8. Thereafter a suitable moistureproof coating 89 is applied to the element by momentarily dipping it in a liquid bath and thereafter allowing the material to dry. A uniform coating is formed around the crystal element and around the wire leads 87, 88, providing excellent resistance to the penetration of moisture.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electro-transducer element comprising a body of electro-transducing material, electrode means on at least one planar surface portion of said body, and a lead comprising a conductor fused into said body at an angle to the plane of said electrode means and in electrical contact with said electrode means.

2. An electro-transducer element as set forth in claim 1 in which said electrode is a layer of electrically conductive graphite particles.

3. The method of fabricating a piezoelectric crystal element comprising the steps of: electroding a face of a plate of piezoelectric crystalline material, heating a lead to a temperature above the melting temperature of said crystalline material, pressing said heated lead against said plate with the direction of extension of said lead at an angle to the plane of said electrode to cause the crystalline material in the immediate vicinity of said heated lead to melt and the lead to cut into the crystalline material sufficiently far that it is in electrical contact with said electrode, and cooling said lead and the melted crystalline material.

4. A multiplate piezoelectric crystal element comprising, a first and a second plate of piezoelectric crystalline material one of which is adapted to expand and the other to contract in a given direction upon being subjected to a given electrostatic field, means securing said plates together in face-to-face relationship with the direction of expansion of said first plate aligned with the direction of contraction of the second plate, inner electrode means between said plates, a first outer electrode on the top surface of said first plate, a second outer electrode on the bottom surface of said second plate, said inner electrode means and said first and second outer electrodes being substantially parallel to each other, a first wire extending through said first and second plates of crystalline material from said first outer electrode to said second outer electrode and making electrical contact with each said first and second outer electrodes, said inner electrode at the location where said first wire extends through it being spaced away from said wire to prevent electrical contact therebetween, a second wire extending through said first and second plates of crystalline material from said top surface of said first plate to said bottom surface of said second plate and making electrical contact with said inner electrode, said first and second outer electrodes at the locations where said second wire extends through said top and bottom surfaces being spaced away from said wire.

5. A multi-plate piezoelectric crystal element as set forth in claim 4 in which said first and second wires extend outwardly away from said crystal element and comprise electrical leads therefor.

6. An electro-transducer element comprising a plate-like body of electro-transducing material having major faces and edge faces, electrode means on at least one of the major faces of said plate-like body, and a lead comprising a conductor fused into said body at an angle to the plane of said electrode means and in electrical contact with said electrode means, one end of said lead projecting out of said body at an edge face.

CHARLES K. GRAVLEY.

REFERENCES CITED

The following references are of record in the file of this patent:

UNITED STATES PATENTS

| Number | Name | Date |
|---|---|---|
| 2,168,943 | Pfundt | Aug. 8, 1939 |
| 2,388,242 | Arndt | Nov. 6, 1945 |